(12) United States Patent
Borkgren (10) Patent No.: US 8,469,114 B1
(45) Date of Patent: Jun. 25, 2013

(54) TOWED IMPLEMENT WITH A STEERING SYSTEM HAVING BOTH WHEEL ASSEMBLIES AND COULTERS

(75) Inventor: Stanley R. Borkgren, Geneseo, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 13/332,962

(22) Filed: Dec. 21, 2011

(51) Int. Cl.
*A01B 5/00* (2006.01)
*A01B 49/02* (2006.01)

(52) U.S. Cl.
USPC .......................................................... 172/166

(58) Field of Classification Search
USPC ................... 111/140, 136, 137, 135, 52, 900, 111/926; 172/26, 166, 6, 4, 283, 395, 396, 172/419
See application file for complete search history.

(56) References Cited

U.S. PATENT DOCUMENTS

| | | | | |
|---|---|---|---|---|
| 4,098,346 A * | 7/1978 | Stanfill et al. | ................ | 172/283 |
| 4,228,860 A * | 10/1980 | Orthman | ........................ | 172/26 |
| 4,506,609 A * | 3/1985 | Fuss et al. | ...................... | 111/136 |
| 4,520,876 A * | 6/1985 | Peterson et al. | .............. | 172/427 |
| 4,819,737 A * | 4/1989 | Frase | ........................... | 172/156 |
| 4,913,070 A * | 4/1990 | Morrison, Jr. | ................ | 111/135 |
| 4,930,581 A * | 6/1990 | Fleischer et al. | ................... | 172/6 |
| 4,974,683 A * | 12/1990 | Hanig et al. | .................... | 172/156 |
| 5,031,704 A * | 7/1991 | Fleischer et al. | ................... | 172/6 |
| 5,086,847 A * | 2/1992 | Meiners | ....................... | 172/466 |
| 5,392,863 A * | 2/1995 | Fixemer | ........................... | 172/6 |
| 5,476,147 A * | 12/1995 | Fixemer | ........................ | 172/26 |
| 5,724,903 A * | 3/1998 | Yoder et al. | .................... | 111/194 |
| 5,813,472 A * | 9/1998 | Fixemer | ........................ | 172/26 |
| 5,826,524 A * | 10/1998 | Yoder | .......................... | 111/194 |
| 6,389,999 B1 * | 5/2002 | Duello | .......................... | 111/200 |
| 7,860,628 B2 * | 12/2010 | Lange | .............................. | 701/50 |
| 2007/0089653 A1 * | 4/2007 | Wendte et al. | ................ | 111/136 |

* cited by examiner

Primary Examiner — Árpád Fábián-Kovács (57) ABSTRACT

An implement, adapted to be towed by a vehicle, has a frame and a plurality of ground engaging tools carried by the frame. Support wheel assemblies carried by the frame are moveable relative the frame to raise and lower the frame between working and non-working positions in which in the working position, the tools engage the ground, and in the non-working position, the tools do not engage the ground. Each wheel assembly is mounted for rotation about a respective wheel steering axis. Coulters are also mounted to the frame and are engagable with the ground only in the working position of the frame. Each coulter is mounted to the frame for rotation about a respective coulter steering axis. Finally, a steering mechanism is operable to turn the wheel assemblies and the coulters each about their respective steering axes to steer the implement.

14 Claims, 6 Drawing Sheets

TOWED IMPLEMENT WITH A STEERING SYSTEM HAVING BOTH WHEEL ASSEMBLIES AND COULTERS

FIELD

This disclosure pertains to towed implement and in particular to an implement having both wheel assemblies and coulters for implement steering.

BACKGROUND

There is a growing recognition of the need for implement steering of towed agricultural implements such as, but not limited to, planters. The need for steering is driven by several factors. First, with increased emphasis on the precision placement of seeds, it is important that the implement be located precisely. Modern auto-steering systems on tractors are capable of keeping the tractor precisely on what is called the A-B line. However, when operating on a hillside or on a contour, the implement will not track on the A-B line but will track inside on the contour and downhill somewhat on the hill side. One solution to keep the implement on the A-B line is to place a GPS receiver on the implement and then guide to tractor off the A-B line such that the implement is on the A-B line. Another solution is to provide the implement with steering capabilities and with a GPS receiver on both the implement and the tractor, guide both the implement and the tractor to stay on the A-B line.

A second need to implement steering is to facilitate alignment of the implement with the desired A-B line after making an end row turn in the field. By steering the implement on the turn rather than relying on the tractor to pull the implement of the desired position, precise placement of the implement is facilitated. A third need for implement steering is to facilitate turning during transport of the implement to and from a field.

Several steering systems for implements have been developed. One system is to use coulters to steer the implement when it is in use in the field. Such a system is available from Orthman Manufacturing under the trade name "Orthman Tracker." A disadvantage of coulters for steering is that they are only available for steering the implement when the implement is in use in the field. When making end row turns or transporting the implement, the coulters are raised out of the ground. A second steering solution is to equip the ground engaging support wheels of the implement with steering capability. This solves the need for steering on end row turns and transport. However, when the implement is in use in the field, the tires have reduced steering capacity. During use, the planter row units are engaging the ground. Supplemental downforce is applied to the row units by transferring weight from the frame to the row units. This reduces the weight on the tires, reducing the ability of the tires to steer the implement. Thus a need exists for a steering system that is effective both during use in the field as well as during end row turns.

SUMMARY OF THE DESCRIPTION

An implement, adapted to be towed by a vehicle, has a frame and a plurality of ground engaging tools carried by the frame. Support wheel assemblies carried by the frame are moveable relative the frame to raise and lower the frame between working and non-working positions in which in the working position, the tools engage the ground, and in the non-working position, the tools do not engage the ground. Each wheel assembly is mounted for rotation about a respective wheel steering axis. Coulters are also mounted to the frame and are engagable with the ground only in the working position of the frame. Each coulter is mounted to the frame for rotation about a respective coulter steering axis. Finally, a steering mechanism is operable to turn the wheel assemblies and the coulters each about their respective steering axes to steer the implement.

When the frame is in the working position, the coulters provide additional steering forces to steer the implement to compensate for the reduced steering forces of the wheel assemblies due to the weight transfer to the row units.

The wheel assemblies and coulters can be mounted to carriage assemblies mounted to the frame with one wheel assembly and one coulter on each carriage assembly. The carriage assemblies may each have a rocker arm pivotally mounted to the frame.

The steering system may have a common actuator to turn both the wheel assemblies and the coulters.

DETAILED DESCRIPTION

Figure 1:
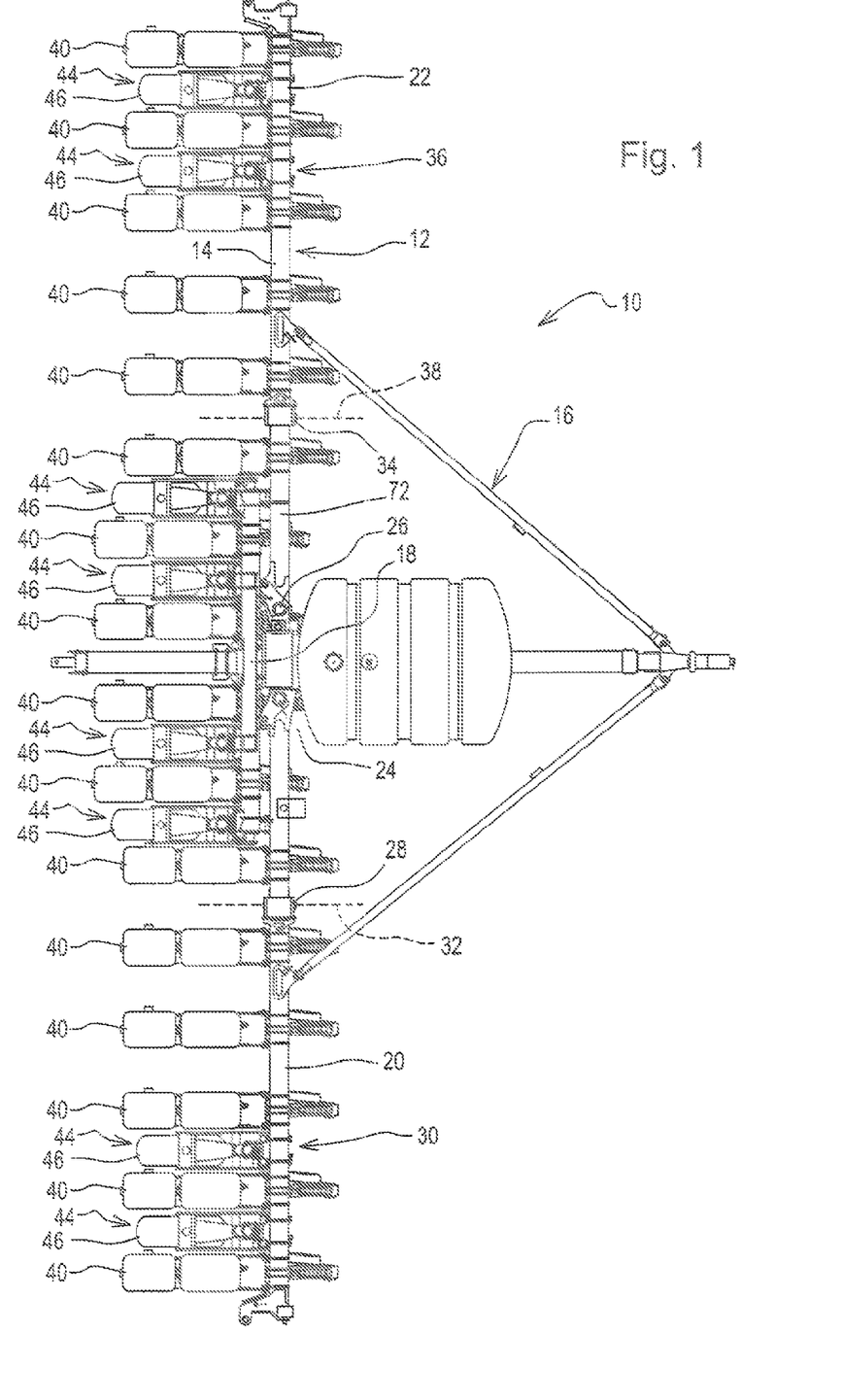
FIG. 1 is a top view of an implement having the steering system as described below.

With reference to FIG. 1, an implement 10 is shown having a frame 12 in the form of a laterally extending tool bar 14. Extending forwardly from the tool bar 14 is a tongue 16 adapted to be coupled to a towing vehicle such as an agricultural tractor (not shown). The tool bar 14 is formed of a center section 18, a right section 20 and a left section 22. The left and right sections are joined to the center section 18 by pivot joints 24 and 26 respectively to allow the left and right sections 20, 22 to be folded forward for a narrower road transport position. The pivot joints 24 and 26 allow pivoting about generally vertical axes. A further pivot joint 28 in the right section 20 divides the right section in two to allow an outer wing portion 30 to pivot about a fore and aft extending horizontal axis 32. This allows the right frame section to follow the ground contours. Likewise, a pivot 34 in the left section allows an outer wing portion 36 to pivot about an axis 38 to follow to the ground contours.

A plurality of ground engaging tools in the form of planter row units 40 are attached to the tool bar 14. The row units are described in greater detail below with reference to FIG. 2. A number of carriage assemblies 44 are also mounted to the tool bar 14. The carriage assemblies are mounted between row units 40. The carriage assemblies will be described in greater detail below in connection with FIGS. 3-5. For now, it is sufficient that the carriage assemblies each include a wheel assembly 46 supporting the frame above the ground. Thus, the implement 10 with the tongue 16 and wheel assemblies 46 is adapted to be towed by a vehicle, such as a tractor.

Figure 2:
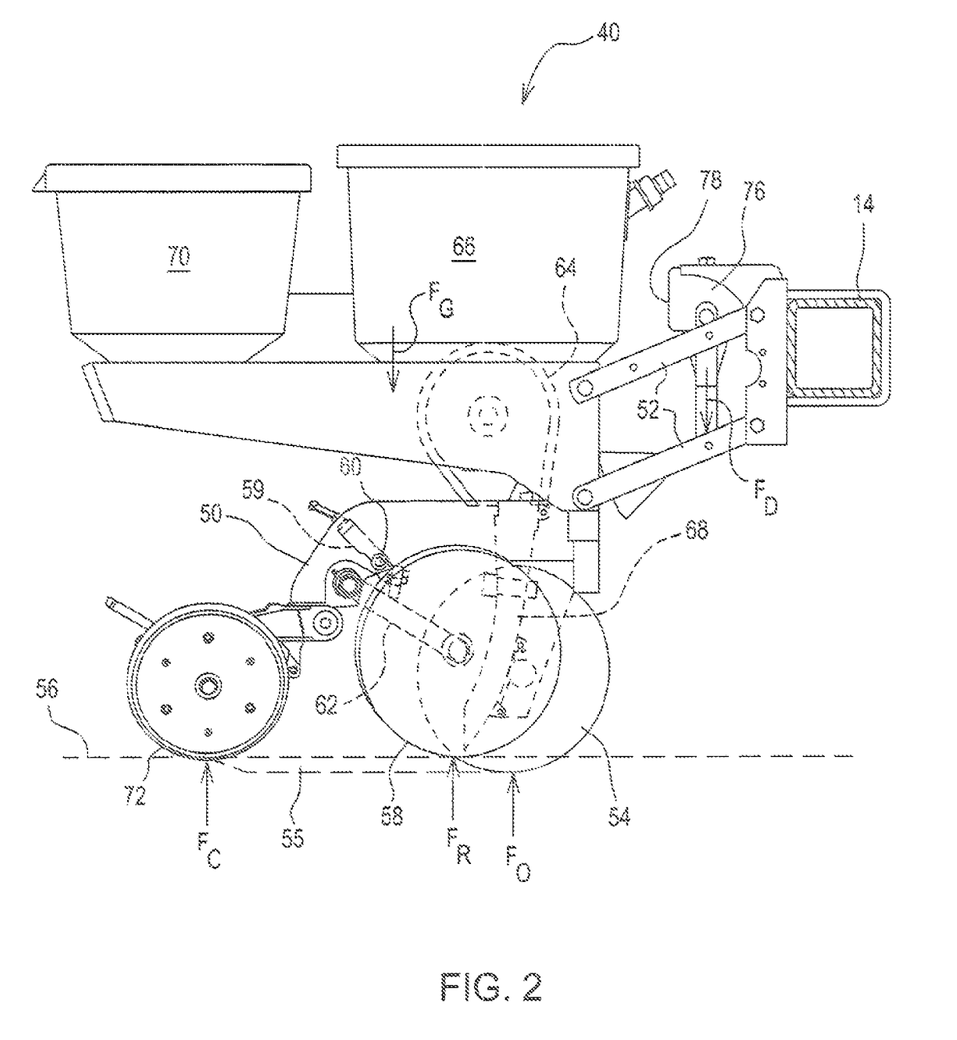
FIG. 2 is a side view of a planting row unit of the implement shown in FIG. 1.

Row units 40 are substantially identical to one another but need not be. Each row unit 40 includes a frame 50 that is attached to the tool bar 14 by parallel arms 52. Arms 52 allow the row unit to move up and down relative to the tool bar 14 to follow the ground. Row unit frame 50 carries a double disc furrow opener 54 for forming a seed furrow 55 in soil or ground 56. A pair of gauge wheels 58 is provided with one on the outside of each disc of the double disc opener. The gauge wheels function as furrow depth regulation members. More particularly, each gauge wheel 58 is positioned slightly behind and immediately adjacent to the outside of the respective disc of double disc furrow opener 52. (The gauge wheels can be placed in other locations relative to the opener discs if desired). The gauge wheels 58 are vertically adjusted relative to the opener discs to adjust the depth the furrow 55 is cut into the soil by the double disc furrow opener 54. Adjustment link 59, pivotally mounted to the frame at 60 locks into place and bears against the top of pivot arms 62 carrying the gauge wheels. The adjustment link 58 thus limits upward movement of the gauge wheels relative to the opener discs.

A seed meter 64 is also carried by row unit frame 50. Seed meter 64 receives seed from a seed hopper 66 carried above the seed meter on the frame 50. The seed meter drive is not shown; numerous types of drive mechanisms are well known. Seed meter 64 delivers seeds sequentially to a seed tube 68 through which the seed falls by gravity to the furrow 55. The seed meter 64 and seed tube 68 form a product dispenser to dispense product to the furrow 54. A second hopper 70 carries a particulate fertilizer or other chemical that is dispensed by another metering system and tube (not shown).

A pair of closing wheels 72 follows behind the gauge wheels and are positioned generally in line with double disc furrow opener 54. Closing wheels 72 are preferably biased in a downward direction and have a peripheral edge with a shape which may vary, depending upon the application. Closing wheels 72 push soil back into the furrow 55 upon the seed or product deposited therein. Numerous types and styles of closing wheels or devices are known.

To penetrate the opener 52 into the ground, there must be sufficient force acting downward on the row unit. The soil reaction force acting upward on the opener is shown by the arrow $F_o$. Additional downward force on the row unit is necessary to produce a soil reaction force $F_c$ acting on the closing wheels 72. Any excess downforce on the row unit beyond the sum of $F_o$ and $F_c$ is applied to the gauge wheels and shown as $F_R$. There must be enough downforce on the row unit to produce a reaction force $F_R$ that is greater than zero. If $F_R$ is zero, then there is no assurance that $F_o$ and $F_c$ are sufficient for the opener and closing wheels to perform their respective functions. The only nature downforce on the row unit is the force of gravity shown as the arrow $F_G$.

To ensure sufficient downforce, a supplemental down force system is added to the row unit. The supplemental downforce system includes a row unit down force actuator 76 in the form of an adjustable pneumatic downforce spring 78 on each row unit 40. The spring 78 acts between the tool bar 14 and the arms 52 to apply supplemental down force $F_D$ to the row unit. As an alternative to the pneumatic spring, an adjustable coil spring may be used to provide the downforce. The pneumatic or coil spring applies downforce by transferring weight from the frame 12 to the row unit. As a result of this weight transfer, the normal forces acting on the wheel assemblies is reduced when the row units are engaging the ground as compared to the normal force acting on the wheel assemblies when the row units are raised from the ground as described below. Due to the reduced normal force on the wheel assemblies when the row units are engaging the ground, the wheel assemblies are not as effective in steering the implement when the row units are lowered as compared to when the row units are raised such as when making turns at the ends of a field.

To improve steering of the implement at all times, the implement 10 is provided with both steering wheel assemblies and steering coulters wherein the coulters only engage the ground when the frame is in the working position with the row units engaging the ground. See FIGS. 3-8. Note that some attaching hardware is not shown for purposes of clarity. The wheel assemblies and coulters are carried by the carriage assemblies 46. The carriage assemblies 44 each include a rocker arm 80. The frame 12 includes mounting brackets 82 attached to the tool bar 14 with one mounting bracket 82 for each rocker arm 80. The mounting brackets 82 include pivots 84 below the tool bar 14 to which the rocker arms 80 are pivotally mounted. The pivots 84 each define a laterally extending pivot axis 86 allowing the rocker arms to move within generally vertical planes extending fore and aft of the implement. The rocker arms 80 are constructed as weldments having laterally spaced side plates 88 and 90 and laterally extending cross members 92 and 94. The pivot 84 fits between the two side plates 88, 90.

Figure 3:
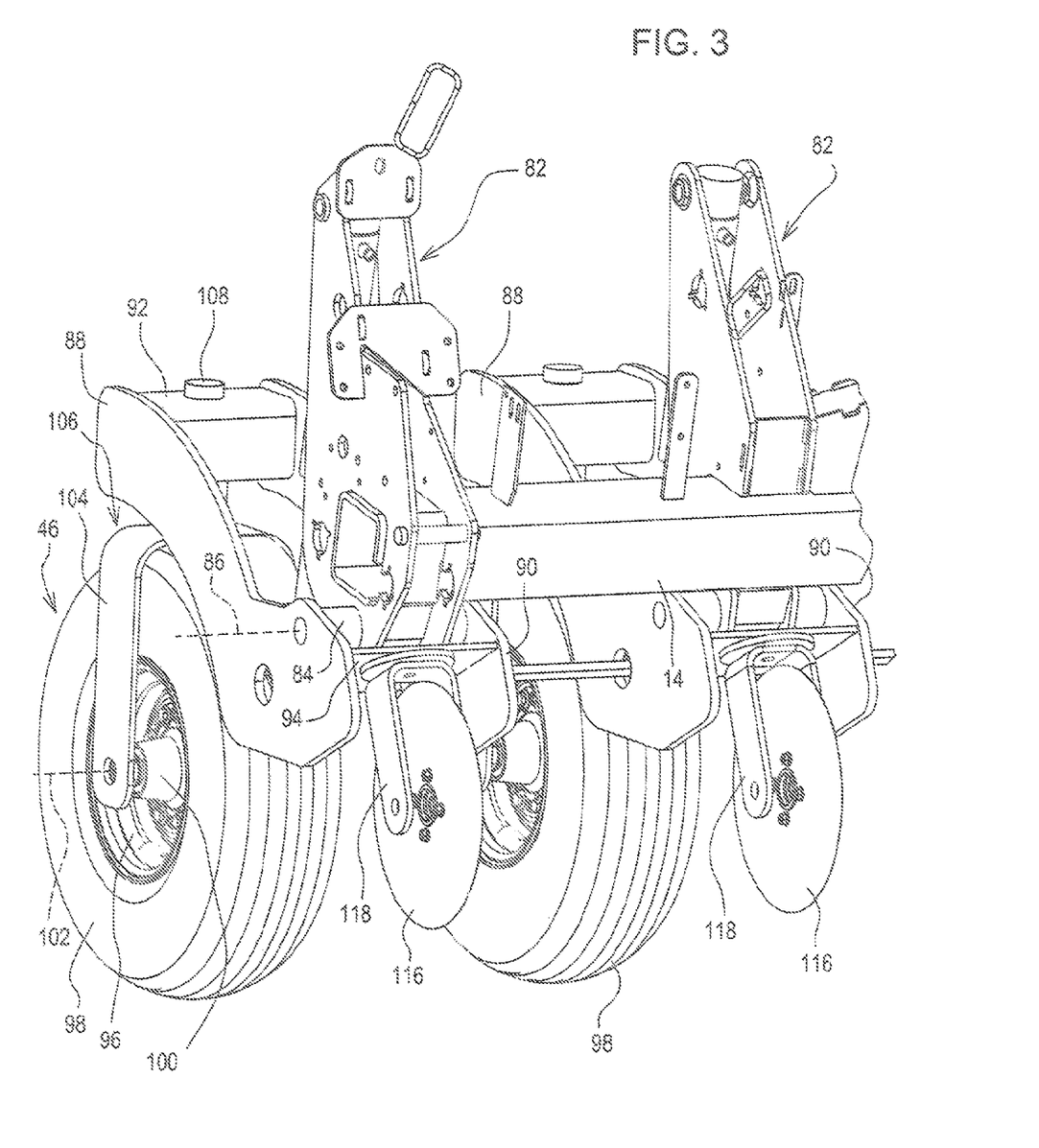
FIG. 3 is a perspective view of a portion of the frame and two carriage assemblies.
Figure 4:
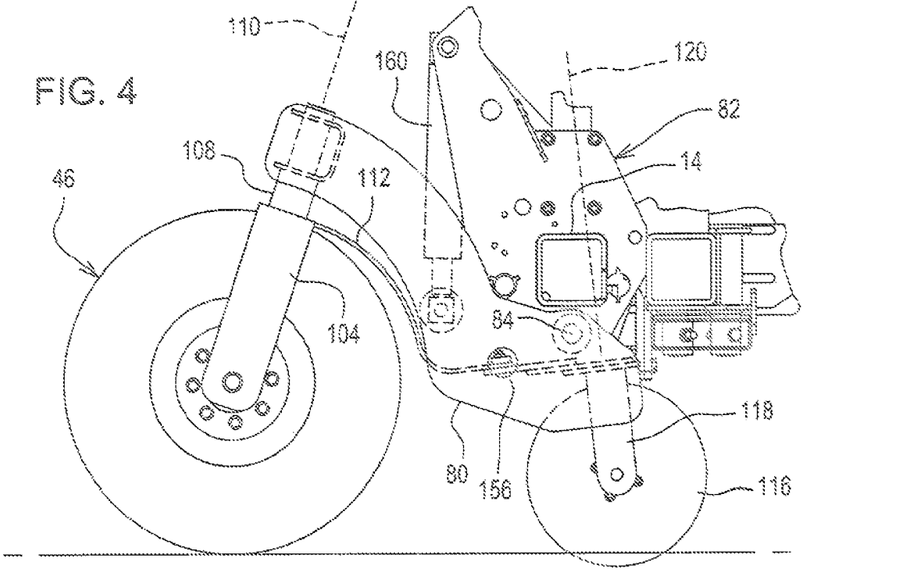
FIG. 4 is a side view of a carriage assembly with the frame in the lowered, working position.
Figure 5:
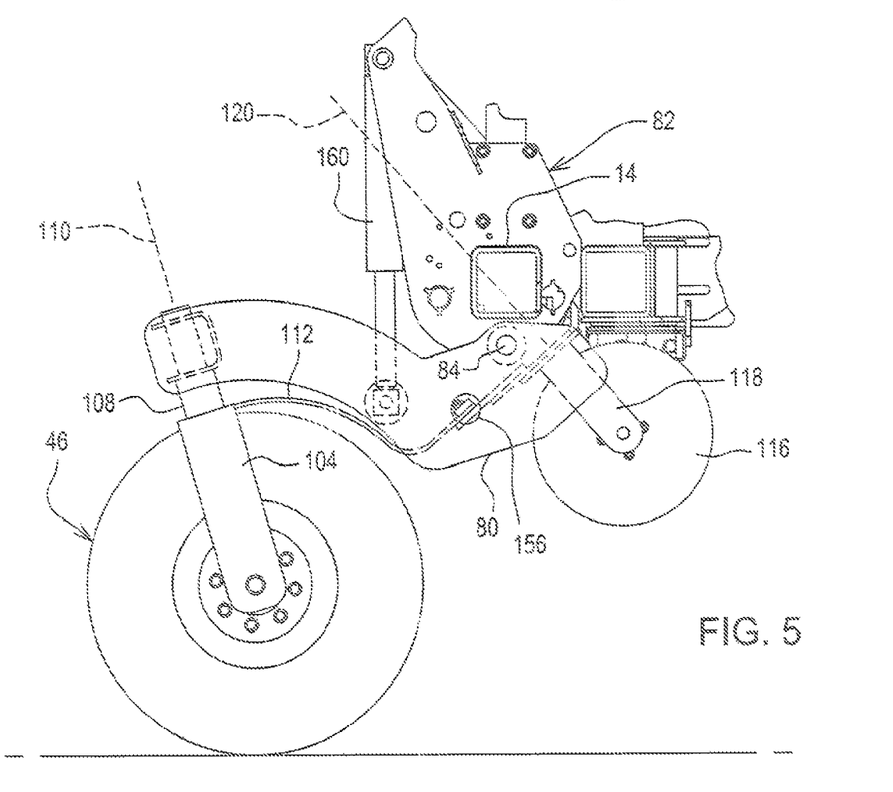
FIG. 5 is a side view of the carriage assembly of FIG. 4 with the frame in the raised, non-working position.

The wheel assembly 46 includes a rim 96 and tire 98 mounted on a hub 100 for rotation about a tire rolling axis 102. The hub is mounted to a yoke 104 that is part of a castor wheel mounting bracket 106. The bracket 106 includes a spindle 108 that is rotationally mounted to the cross member 92 to allow the bracket 106 to pivot about a wheel steering axis 110. The bracket 106 further includes a wheel steering arm 112 extending radially from the axis 110 in a generally forwardly direction between the two side plates 88, 90.

Figures 6, 7:
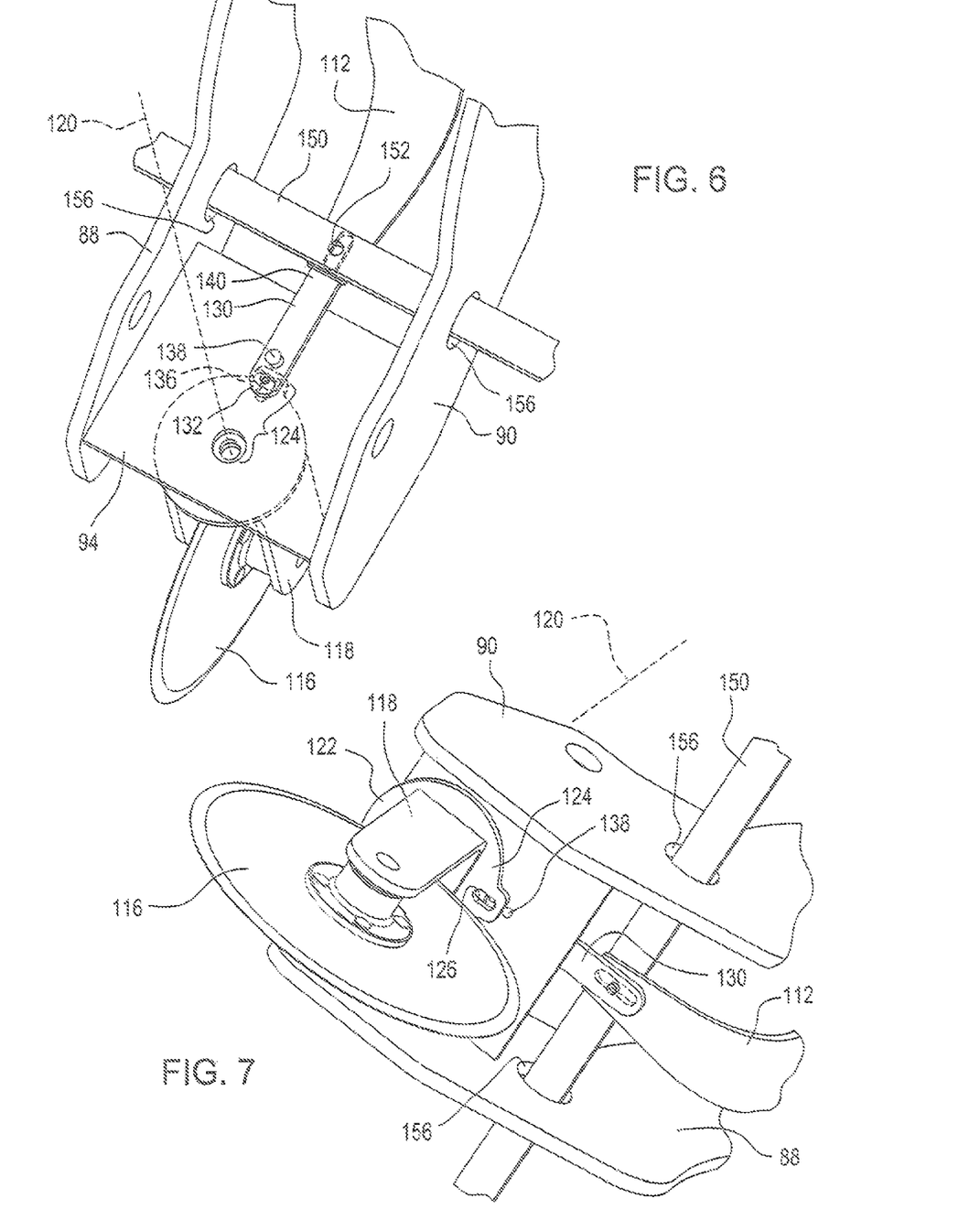
FIG. 6 is a top perspective view of the front portion of a carriage assembly illustrating the coulter and steering mechanism.
FIG. 7 is a bottom perspective view of the front portion of a carriage assembly illustrating the coulter and steering mechanism looking upward.
Figure 8:
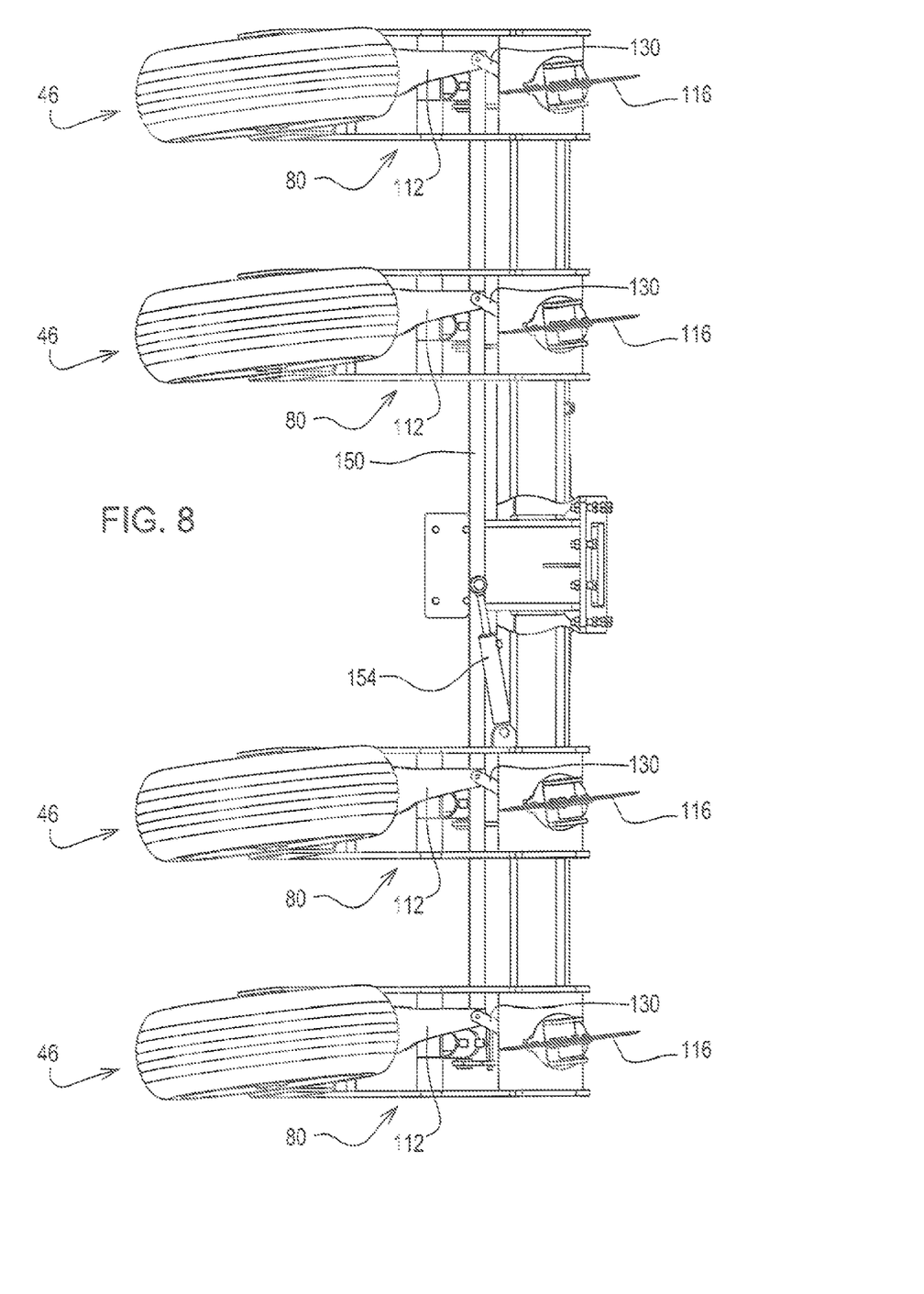
FIG. 8 is a bottom view of the center portion of the implement frame looking upward.

A coulter 116 is similarly mounted to the rocker arm 80 but at an end of the rocker arm opposite from the wheel assembly 46 with the pivot 54 between the wheel assembly 46 and the coulter 116. The coulter is rotationally mounted to a yoke 118 that is in turn pivotally mounted to the cross member 94 for pivoting about a coulter steering axis 120. An upper plate 122 of the yoke 118 forms a coulter steering arm 124 extending radially from the coulter steering axis 120 to the slot 126. The coulter steering arm extends rearwardly toward the wheel steering arm 112. To enable a single tie rod to be used to turn both the wheel assembly and the coulter, a switch link 130 is provided to change the direction of motion between the tie rod and the coulter. The switch link 130 is pivotally mounted to the cross member 94 and has one end 132 pinned to the slot 126 in the upper plate 122 of the coulter yoke 118. The pin 134 extends through a slot 136 in the cross member 94. The switch link 130 is pivotally mounted to the cross member 94 at a pin 138. The opposite end 140 of the switch link 130 and the end of the wheel steering arm 112 are coupled to a tie rod 150 by a pin joint 152. The tie rod 150 is elongated and extends through openings 156 in the side plates 88, 90 of the rocker arm 80. As shown in FIG. 8, the tie rod position is controlled by an actuator in the form of a hydraulic cylinder 154. The base end of the cylinder 154 is coupled to a rocker arm 80 of one carriage assembly 44 for movement therewith. The rod end of the cylinder 154 is coupled to the tie rod 150. The tie rod and cylinder move together with the rocker arms 80. The tie rod 150 and the hydraulic cylinder 154 form a steering system.

When the tie rod 150 is moved to the right as viewed in FIG. 8, the wheel yoke 104 and rim and tire rotate clockwise about the wheel steering axis 110. The switch link 130 rotates counterclockwise about the pin 138, causing the switch link end 132 to move to the left as viewed in FIG. 8. This rotation of the switch link causes the coulter yoke 118 to also rotate clockwise about the coulter steering axis 120. Both the coulter 116 and the wheel assembly 46 are pivoted in the same direction about their respective steering axis. Movement of the tie rod to the left produces rotation of the wheel assemblies 46 and coulters 116 in the opposite direction. With reference to FIG. 1, one tie rod and steering cylinder are provided to turn the four wheel assemblies and coulters at the center of the implement. A right side tie rod and steering cylinder are provided for the two wheel assemblies at the right side of the implement while a left side tie rod and steering cylinder are provided for the two wheel assemblies and coulters at the left side of the implement. More or fewer wheel assemblies, coulters, tie rods and steering cylinders are used depending on the width of the implement. The hydraulic steering cylinders are controlled to move in unison with one another.

Each rocker arm is held in position by a hydraulic cylinder 160. The cylinder 160 has one end attached to the mounting bracket 82 while the other end of the cylinder is attached to the rocker arm 80. With the cylinder retracted, the rocker arm 80 is in the position shown in FIG. 4. In this position, both the wheel assembly 46 and the coulter 116 engage the ground. The row units 40 mounted to the frame also engage the ground. This is the working position of the frame. When the cylinder 160 is extended, the rocker arm 80 is rotated relative to the frame counterclockwise as viewed in FIGS. 4 and 5 to the position shown in FIG. 5. This raises the frame relative to the wheel assembly 46 to raise the row units 40 out of the ground. This is the non-working position of the frame. In the non-working position of the frame, the coulter 116 is also raised from the ground.

In both the working and non-working positions of the frame, the steering cylinder is operational to rotate the wheel assemblies 46 and the coulters 116. When the frame is in the working position, with the row units engaging the ground, the wheel assemblies 46 and the coulters 116 will both act to steer the implement. The added steering forces of the coulters 116 compensates for the reduced steering forces of the wheel assemblies due to the reduced weight on the wheel assemblies when the row units are engaging the ground. When the frame is raised to the non-working position, all the implement weight is carried by the wheel assemblies and they are then capable of providing all the steering forces needed to steer the implement.

As described, the switch link 130 enables both the wheel assemblies and coulters to turn the same direction with a common tie rod located between the wheel assemblies and coulters in the fore-aft direction. The lengths of the switch links, the coulter steering arms and the wheel steering arms are determined so as to produce the desired angle of rotation of the wheel assemblies and coulters. While the carriage assemblies are shown with the coulters in front and the wheel assemblies in the rear, their respective locations can be reversed. Also, an electric actuator can be used in place of the hydraulic steering cylinder 154.

Having described the implement, it will become apparent that various modifications can be made without departing from the scope as defined in the accompanying claims.

What is claimed is:

1. An implement adapted to be towed by a vehicle comprising:
    a frame
    a plurality of ground engaging tools carried by the frame
    a plurality of support wheel assemblies carried by the frame and moveable relative the frame to raise and lower the frame between working and non-working positions in which in the working position the tools engage the ground and in the non-working position the tools do not engage the ground, each wheel assembly mounted to the frame for rotation about a respective wheel steering axis;
    a plurality of coulters mounted to the frame and engagable with the ground in the working position and not engagable with the ground in the non-working position, each coulter mounted to the frame for rotation about a respective coulter steering axis; and
    a steering mechanism operable to turn the wheel assemblies and the coulters each about their respective steering axes to steer the implement.

2. The implement of claim 1 wherein the steering system includes an actuator that is operable to turn at least a portion of the wheel assemblies and at least a portion of the coulters about their respective steering axes.

3. An implement adapted to be towed by a vehicle comprising:
    a frame
    a plurality of ground engaging tools carried by the frame
    a plurality of carriage assemblies pivotally mounted to the frame, each carriage assembly having a wheel assembly to support the implement, the carriage assemblies being pivotally mounted to the frame to raise and lower the frame between a working position in which the tools engage the ground and a non-working position in which the tools are raised from the ground, each wheel assembly mounted to the respective carriage assembly for rotation about a wheel steering axis;
    each of the carriage assemblies further having a coulter that engages the ground in the working position and which is raised from the ground in the non-working position, each coulter mounted to the carriage assembly for rotation about a respective coulter steering axis; and
    a steering mechanism operable to turn the wheel assemblies and the coulters about their respective steering axes to steer the implement whereby only the wheel assemblies are operable to steer in the non-working position and both the wheel assemblies and coulters are operable to steer the implement in the working position.

4. The implement of claim 3 wherein each carriage assembly includes a rocker arm pivotally mounted to the frame at a location intermediate the ends of the rocker arm with a wheel assembly attached to one end of the rocker arm and a coulter attached to the other end of the rocker arm.

5. The implement of claim 3 wherein the steering mechanism includes a tie rod coupled to the wheel assemblies and coulters of two or more carriage assemblies and a linear actuator to move the tie rod to turn the wheel assemblies and coulters about their respective steering axes.

6. The implement of claim 5 wherein each of the wheel assemblies and coulters has a steering arm coupled thereto which is connected to the tie rod to turn the wheel assemblies and coulters about their respective steering axes as the tie rod is moved.

7. The implement of claim 6 wherein the steering arms coupled to the wheel assemblies extend forwardly relative to the wheel steering axis and the steering arms coupled to the coulters extend rearwardly relative to the coulter steering axis with the tie rod extending laterally of the implement between the wheel assemblies and the coulters.

8. An implement adapted to be towed by a vehicle comprising:
    a frame
    a plurality of ground engaging tools carried by the frame
    a plurality of wheel assemblies supporting the frame above the ground and moveable relative the frame to raise and lower the frame between working and non-working positions in which in the working position the tools engage the ground and in the non-working position the tools do not engage the ground;

a plurality of coulters carried by the frame and engaged with the ground when the frame is the working position and not engaged with the ground when the frame is in the non-working position;

a steering system adapted to turn the wheel assemblies and the coulters to steer the implement, the steering system having an actuator coupled to both wheel assemblies and coulters to turn both wheel assemblies and coulters.

9. The implement of claim 8 wherein at least a portion of the wheel assemblies and a portion of the coulters are paired with one another with one wheel assembly associated with one coulter.

10. The implement of claim 9 further comprising a rocker arm pivotally coupled to the frame with one of the paired wheel assembly and coulter mounted thereto with the wheel assembly and the coulter on opposite sides of the pivotal connection relative to one another such that in the non-working position, the wheel assembly engages the ground and in the working position, both the wheel assembly and the coulter engage the ground.

11. The implement of claim 10 further comprising a tie rod coupled to both the wheel assembly and coulter of one of the pairs of wheels assemblies and coulters to steer both the wheel assembly and coulter.

12. The implement of claim 11 wherein the wheel assembly is mounted to the rocker arm to turn about a wheel steering axis and the counter is mounted to the rocker arm to turn about a coulter steering axis and further comprising a wheel steering arm coupled to the wheel assembly and extending radially relative to the wheel steering axis and a coulter steering arm coupled to the coulter and extending radially relative to the coulter steering axis; and wherein the tie rod is coupled to both the wheel steering and the coulter steering arms to enable turning of the wheel assembly and the coulter about their respective steering axes upon movement of the tie rod.

13. The implement of claim 12 wherein the tie rod extends laterally of the implement between the wheel assembly and the coulter with the wheel steering arm and the coulter steering arms extending fore and aft generally toward one another and further comprising a switching linkage between the tie rod and one of the wheel and coulter steering arms to enable both the wheel assembly and the coulter to turn in the same direction upon movement of the tie rod.

14. The implement of claim 13 wherein the switching linkage includes a connecting link pivotally mounted to the frame and connected at one end to the tie rod and at the other end to one of the wheel steering arm and the coulter steering arm.

\* \* \* \* \*